US012578173B2

(12) United States Patent
Lang et al.

(10) Patent No.: US 12,578,173 B2
(45) Date of Patent: Mar. 17, 2026

(54) ADDITIVELY MANUFACTURED METAL CASINGS

(71) Applicant: COMPOSITE TECHNOLOGY R & D PTY LIMITED, Sydney (AU)

(72) Inventors: Jeffrey Lang, Sydney (AU); Anthony J Khouri, Sydney (AU)

(73) Assignee: Composite Technology R & D PTY LIMITED, Sydney (AU)

( * ) Notice: Subject to any disclaimer, the term of this patent is extended or adjusted under 35 U.S.C. 154(b) by 0 days.

(21) Appl. No.: 18/565,607

(22) PCT Filed: May 31, 2022

(86) PCT No.: PCT/AU2022/050533
§ 371 (c)(1),
(2) Date: Nov. 30, 2023

(87) PCT Pub. No.: WO2022/251910
PCT Pub. Date: Dec. 8, 2022

(65) Prior Publication Data
US 2024/0247921 A1      Jul. 25, 2024

(30) Foreign Application Priority Data

May 31, 2021      (AU) ................................. 2021901627

(51) Int. Cl.
| *F42B 33/00* | (2006.01) |
| *B22F 10/25* | (2021.01) |
(Continued)

(52) U.S. Cl.
CPC .............. *F42B 12/76* (2013.01); *B22F 10/25* (2021.01); *F42B 12/20* (2013.01); *F42B 33/00* (2013.01); *B33Y 10/00* (2014.12); *B33Y 80/00* (2014.12)

(58) Field of Classification Search
CPC .......... F42B 12/76; F42B 12/20; F42B 33/00; F42B 12/22; F42B 12/08; F42B 25/00;
(Continued)

(56) References Cited

U.S. PATENT DOCUMENTS

| 10,416,564 B1 | 9/2019 | Manz et al. |
| 2005/0011395 A1* | 1/2005 | Langan ................... F42B 1/032 |
| | | 102/476 |
(Continued)

FOREIGN PATENT DOCUMENTS

| CN | 107236949 A | 10/2017 |
| EP | 2172292 A1 | 4/2010 |
(Continued)

OTHER PUBLICATIONS

Official Action mailed Nov. 30, 2023 in Australian Application No. 2022287496, 4 pages.
(Continued)

*Primary Examiner* — Rebecca Janssen
(74) *Attorney, Agent, or Firm* — Procopio, Cory, Hargreaves & Savitch LLP

(57) ABSTRACT

An embodiment of the bomb casing (1) defines a generally conical nose portion (2) and a cylindrical body portion (3). At least one, and more preferably both, of the generally conical nose portion (2) and/or the cylindrical body portion (3) are formed from an additive manufacturing process, which is preferably cold-gas dynamic spraying of metal particles onto a support member. In one embodiment, the generally conical nose portion and cylindrical body portion are integrally formed.

5 Claims, 5 Drawing Sheets

(51) Int. Cl.
    *B33Y 10/00*         (2015.01)
    *F42B 12/20*         (2006.01)
    *F42B 12/76*         (2006.01)
    *B33Y 80/00*         (2015.01)

(58) Field of Classification Search
    CPC .......... B22F 10/25; B22F 10/64; B22F 12/53;
        B22F 5/106; B22F 2999/00; B22F 12/00;
        B33Y 10/00; B33Y 80/00; B33Y 40/20;
        B05B 13/0431; B05B 7/1463; B05B
        7/1486; B05B 7/1626; B05B 13/0442;
        B05B 13/0278; C23C 24/08; C23C 24/04;
        C23C 24/085; C23C 24/087; C22C 1/045;
        Y02P 10/25
    See application file for complete search history.

(56) References Cited

U.S. PATENT DOCUMENTS

2005/0235862 A1*  10/2005  Gousman ................ F42B 12/76
                     102/493

2016/0178336 A1*  6/2016  Jennett ................. F42B 12/207
                     102/506
2021/0115566 A1*  4/2021  Gold .................... C23C 30/005

FOREIGN PATENT DOCUMENTS

| | | |
|---|---|---|
| EP | 3757018 A1 | 12/2020 |
| WO | 2020190192 A1 | 9/2020 |

OTHER PUBLICATIONS

Notice of Acceptance of Patent Application mailed Dec. 2, 2024 in Australian Application No. 2022287496, 4 pages.
European Extended Search Report mailed Mar. 4, 2025 in European Application No. 22814608, 9 pages.
International Search Report and Written Opinion mailed Aug. 9, 2022 in international application serial No. PCT/AU2022/050533, 11 pages.
Office Action and Search Report issued Apr. 15, 2025 for UAE Application No. P6003118/2023, 8 pages.
Office Action issued Sep. 24, 2025 for UAE Application No. P6003118/2023 and its English Translation, 2 pp.

* cited by examiner

ADDITIVELY MANUFACTURED METAL CASINGS

TECHNICAL FIELD

The present invention relates to devices and associated methods for additively manufactured metal casings. Embodiments of the present invention find application, though not exclusively, in the fields of munitions, weapons and in particular bomb casings.

BACKGROUND ART

Any discussion of documents, acts, materials, devices, articles or the like which has been included in this specification is solely for the purpose of providing a context for the present invention. It is not to be taken as an admission that any or all of these matters form part of the prior art base or were common general knowledge in the field relevant to the present invention as it existed in Australia or elsewhere before the priority date of this application.

Casings for warheads have differing characteristics which are dependent on the proposed specific usage of the warhead, such as: air to air; ground to air; air to ground; ground to ground; and structural demolition charge applications. In order to ensure that a warhead is effective, consideration must be given to the ability of the casing to penetrate the intended target and to fragment. Design parameters which contribute to performance of the casing include shape, mass, material composition, mechanical properties and fragmentation performance.

Warhead casing design selections are based on the functional considerations which can include aerodynamic efficiency, penetration performance or fragmentation patterns. In the case of BLU (i.e. Bomb Live Unit, aka bunker buster bombs), the casing plays an important role in the penetrative ability of the system.

BLU warheads typically consist of three core components which are joined: nose cone, cylindrical main body and tail portion. Conventional warhead manufacturing methods typically use casting or forging technologies to construct these core components separately before they are joined in a final assembly process. Separate part construction of BLU's is necessitated by the need to achieve a higher hardness in the nose section of the casing in order to ensure proper penetrative performance. Material selections and designs are generally restricted to those capable of casting or forging, limiting allowable shapes, sizes, material compositions, capabilities, and effects. Multiple part subassembly constructions (particularly for combined effects features) are typically used. These increase labour, parts count, design, development and production costs while reducing design options.

Conventional warhead manufacturing methods involve design and fabrication of moulds and other overheads that hinder development of new warhead design concepts. This tooling requirement lengthens both the design and fabrication cycles, necessitates significant upfront and specialized infrastructure expenses, and fails to efficiently support rapid prototyping activities.

The casting or forging techniques typically used to form bomb casings also require significant energy inputs to melt the materials. Investment in a forging plant can be prohibitively expensive, which has tended to restrict suppliers to only few manufacturers globally.

In pursuit of design freedom, Lockheed Martin has patented a method for additive manufacturing of warhead casings using directed energy deposition of materials. This method however comes with the drawback of thermal distortion due to the concentrated application of heat to portions of the part which can create distortions and affect the recrystallisation of the metals on solidification from melt pool.

Other examples of prior art include U.S. Pat. No. 2,410,813A, Method of Forming Casings, Walter Dillon, Aug. 5, 1942, which describes fundamental casing manufacturing steps. Instead of forging or casting of the casing, the inventor describes a method of applying heat and rolling a seamless steel tube to form the nose cone of the casing.

Another example of the prior art is U.S. Pat. No. 5,305,505A, Process of Making a Multi-Section Bomb Casing, Ellwood National Investment Corp., Dec. 3, 1990, which describes a process for making multi-section bomb casings which have the strength and fracture properties of casings of single-piece construction. The casing is made up of two or more alloy steel sections by friction welding techniques.

SUMMARY OF THE INVENTION

It is an object of the present invention to overcome, or substantially ameliorate, one or more of the disadvantages of the prior art, or to provide a useful alternative.

In one aspect of the present invention there is provided a bomb casing defining a generally conical nose portion and a cylindrical body portion, at least one of the generally conical nose portion and/or the cylindrical body portion being formed from an additive manufacturing process.

Preferably the additive manufacturing process is cold-gas dynamic spraying of metal particles onto a support member.

In one embodiment the generally conical nose portion and cylindrical body portion are integrally formed. In another embodiment the bomb casing is of unitary construction.

In one embodiment the generally conical nose portion and/or the cylindrical body portion may have substantially uniform metal properties along its length. In another embodiment the generally conical nose portion and/or the cylindrical body portion may have substantially uniform metal properties across each transverse cross-section taken along its length.

Preferably the support member is configured to reflect an intended configuration of an internal surface of the bomb casing.

After cold-gas dynamic spraying has been completed, the support member may be retained within the bomb casing. Alternatively, after cold-gas dynamic spraying has been completed, the support member may be retained within the bomb casing at one or more locations and removed from other locations. In other embodiments, after cold-gas dynamic spraying has been completed, the support member is removed altogether.

Preferably the casing has metal properties along its axial position defining a rupture mechanism and/or rupture seams. In one embodiment the rupture mechanism and/or rupture seams are defined by geometric features on the scaffold and/or combined with geometric features on a final outer shape of the bomb casing. In one embodiment the rupture mechanism and/or rupture seams are lines of weakness extending axially and/or transversely along the cylindrical body portion.

In one embodiment the metal particles sprayed so as to form the generally conical nose portion include high density refractory metals or alloys.

In one embodiment the generally conical nose section has the following properties:

an ultimate tensile strength of greater than 1320 MPa;
a yield tensile strength of greater than 1200 MPa;
a minimum elongation-at-break of 11%;
a through hardness of greater than 44 Rockwell C scale; and
a density of greater than 7.86 g/cc.

Preferably the metal particles, as deposited onto the support member, form interlaced layers. In one embodiment the interlaced layers extend in a circumferential direction. Preferably the interlaced layers forming the cylindrical body portion have an elongate dimension extending parallel to a longitudinal axis of the cylindrical body portion.

The features and advantages of the present invention will become further apparent from the following detailed description of preferred embodiments, provided by way of example only, together with the accompanying drawings.

BRIEF DESCRIPTION OF THE ACCOMPANYING DRAWINGS

DETAILED DESCRIPTION OF PREFERRED EMBODIMENTS OF THE INVENTION

Figure 1:
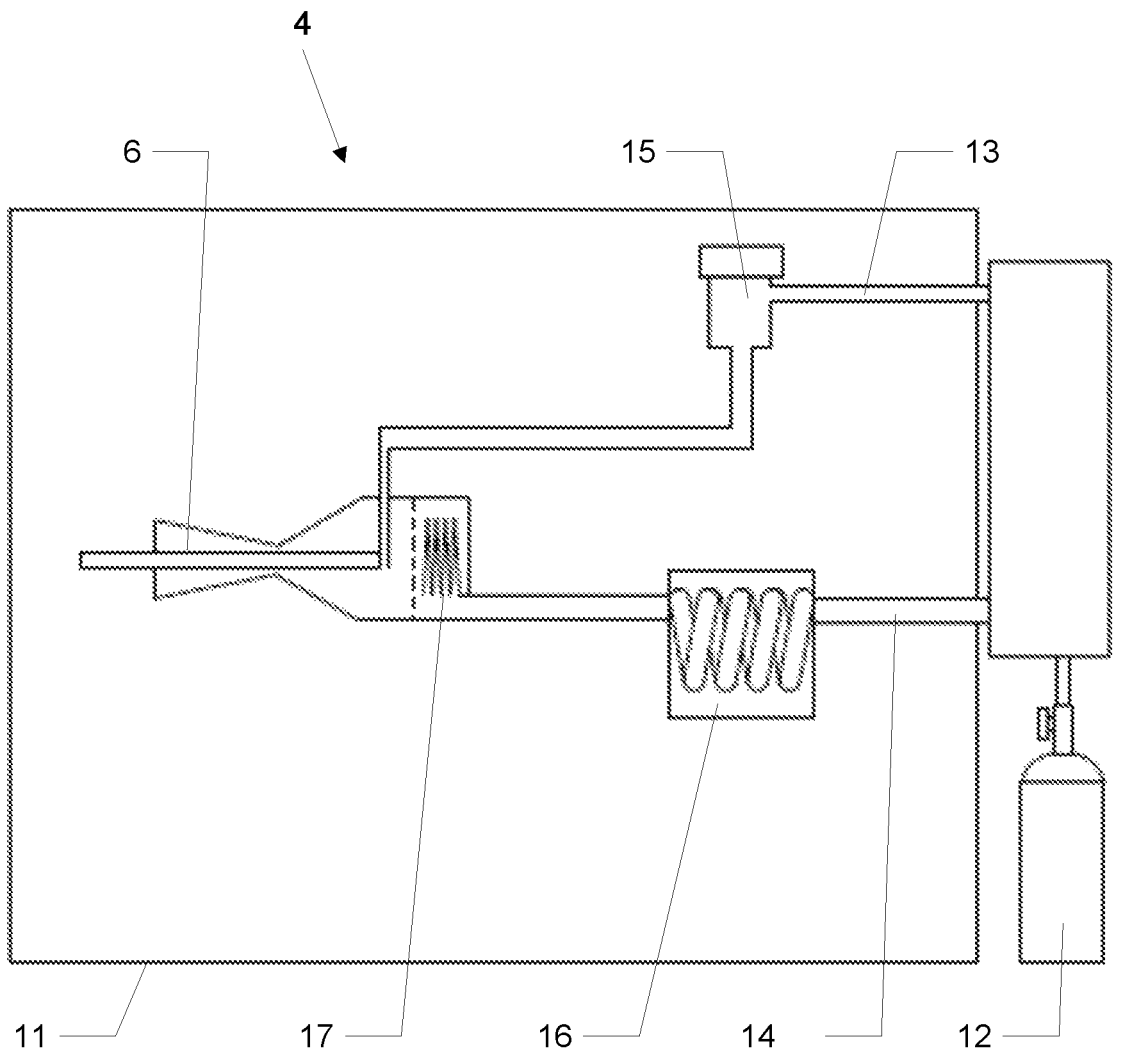
FIG. 1 is a schematic diagram depicting the major components of a cold-gas dynamic spraying apparatus.

As shown, for example, in FIGS. 3 to 8, the illustrated embodiments of the bomb casings 1 each define a generally conical nose portion 2 and a cylindrical body portion 3. At least one, or the other, of the generally conical nose portion 2, or the cylindrical body portion 3, is additively manufactured using additive manufacturing equipment. In the embodiment illustrated in FIG. 5, it is only the generally conical nose portion 2 that is additively manufactured and is subsequently connected to a traditionally-manufactured cylindrical body portion 3. However, more preferably both the generally conical nose portion 2 and the cylindrical body portion 3 are additively manufactured. The latter is the type of manufacturing process that will be mainly discussed below.

Some examples of additive manufacturing equipment make use of heat sources, for example lasers, electron beams, etc. to heat metal powder or wire. The heated metal then consolidates to produce a desired three-dimensional object. The additive manufacturing equipment 4 used in the preferred embodiment of the process is configured for cold-gas dynamic spraying of metal particles 5 entrained within a gas stream emanating from at least one nozzle 6. In some embodiments of the manufacturing process, more than one nozzle 6 may be utilized so as to increase the manufacturing production rate. In one embodiment the cold-gas dynamic sprayed metal particles 5 are high strength steel. In another embodiment the metal particles 5 that are sprayed to form the conical nose portion 2 are a steel alloy, such as nickel-chromium-molybdenum alloy steel (SAE4340).

Figure 2:
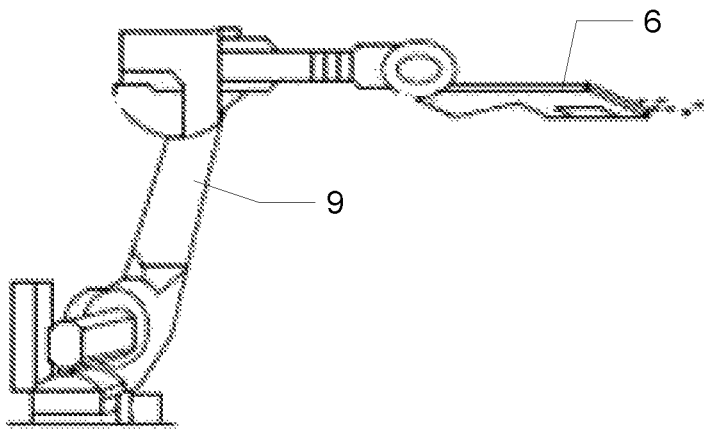
FIG. 2 is a side view of a robotic nozzle handling assembly.

As best shown in FIGS. 1 and 2, the additive manufacturing equipment 4 includes a rotatable mandrel shaped so as to mate with a support member 8 (which may also be referred to as a substrate or a scaffold). A drive, such as an electric motor, is configured to rotate the mandrel, which, in turn, rotates the support member 8. This arrangement is suitable for the manufacture of casings having axial symmetry, which is believed to be applicable to most bomb casing designs. This allows the support member 8 to rotate as material is deposited onto it, whilst the nozzle is held stationary or only moved relatively slowly. This is more efficient as compared to keeping the support member 8 stationary and having to repeatedly displace the nozzle around the support member 8 whilst depositing material onto the support member 8.

Figure 3:
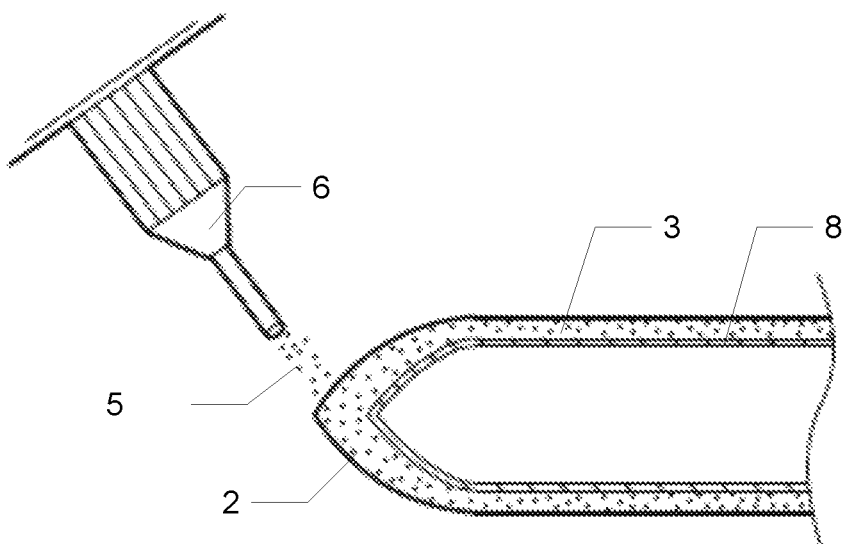
FIG. 3 is a partially cross-sectional side view of the cold-gas dynamic spraying of material to form an embodiment of a casing.
Figure 4:
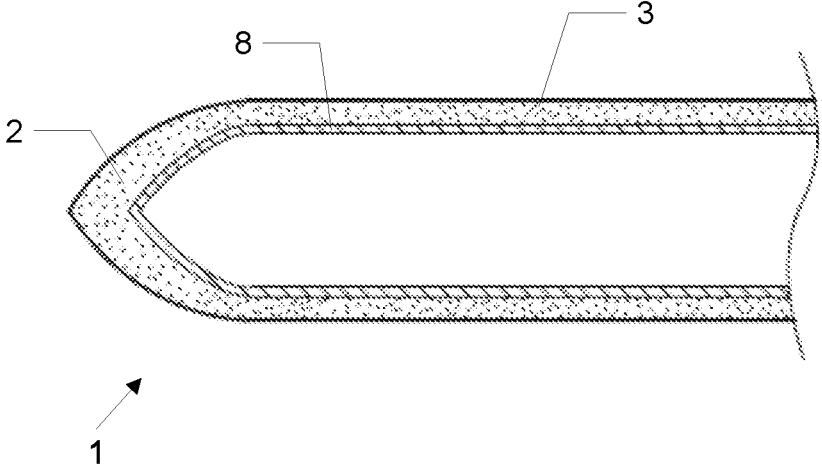
FIG. 4 is a cross-sectional partial view of an embodiment of a casing.
Figure 5:
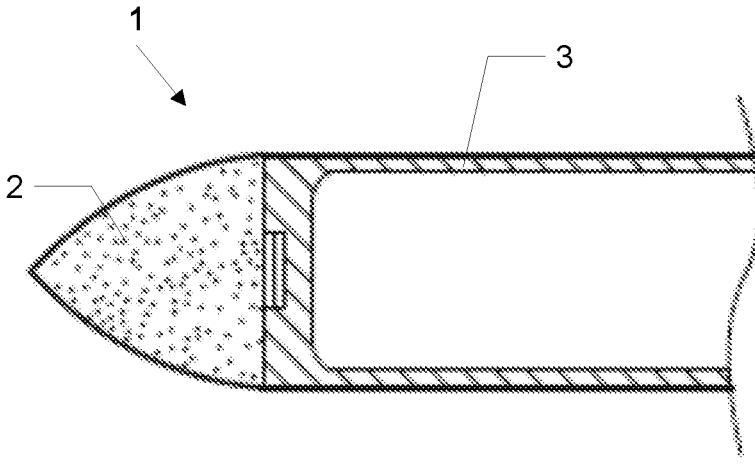
FIG. 5 is a cross-sectional partial view of another embodiment of a casing.
Figure 6:
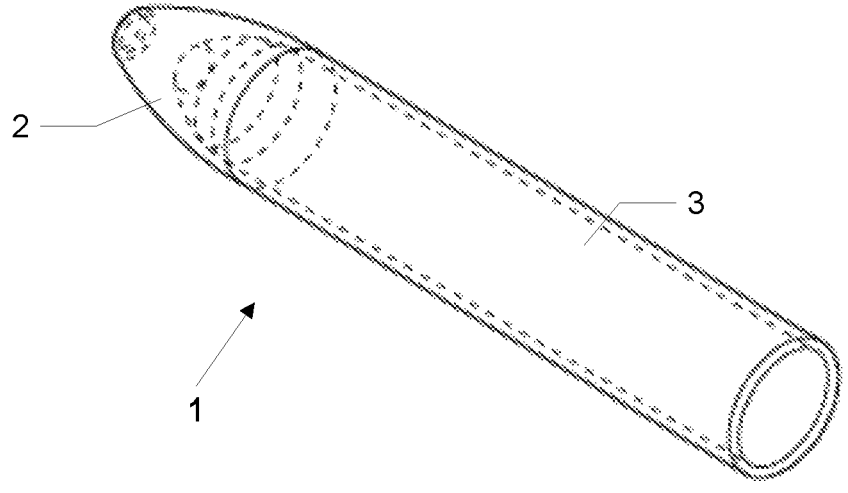
FIG. 6 is an isometric view showing hidden detail of another embodiment of a casing.
Figure 7:
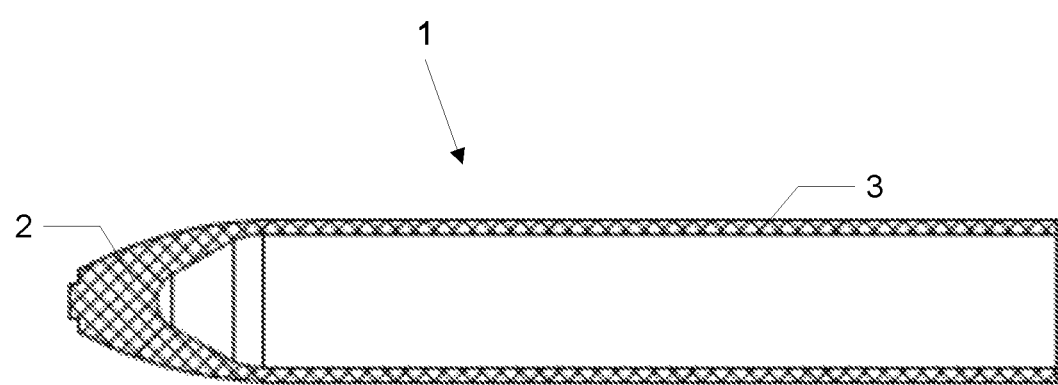
FIG. 7 is a cross-sectional view of the embodiment depicted in FIG. 6.
Figure 8:
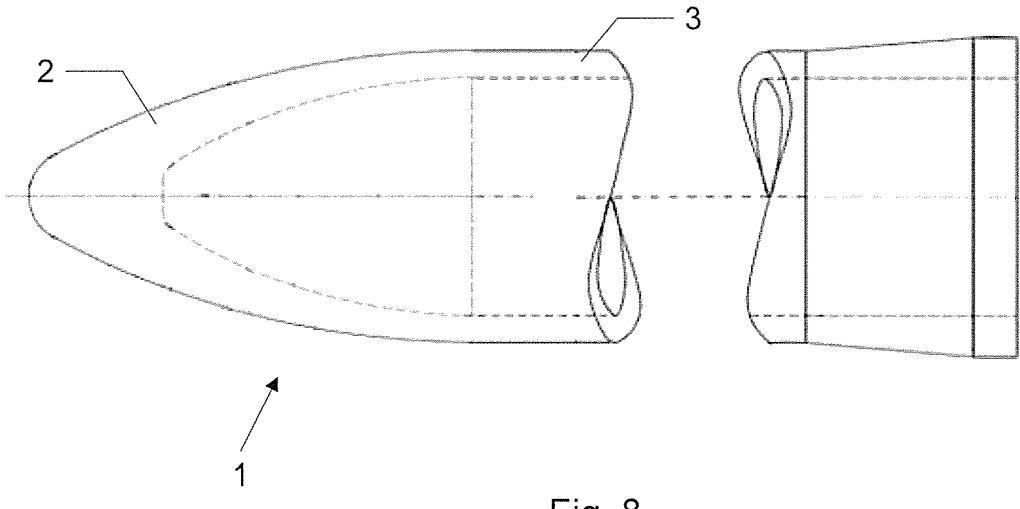
FIG. 8 is a side view showing hidden detail of another embodiment of a casing.

As best shown in FIGS. 3 and 4, the support member 8 is axially symmetrical and has a pre-machined outer surface that corresponds to the desired shaping of the bomb casing that is to be manufactured. In one embodiment the support member 8 is made of aluminium, preferably grade 6061 aluminium. In another embodiment the support member 8 is made of copper.

As best shown in FIG. 1, the cold-gas dynamic spraying equipment includes an enclosure 11 into which high pressure process gas from a gas source 12 is fed via a pair of circuits 13 and 14. It is desirable for the process gas to be relatively inert because it is undesirable for the process gas to react with the metal. Nitrogen is used as the process gas in the preferred embodiment because it is relatively inert and is widely available at a relatively low price. However, other embodiments make use of other inert gasses, such as helium and/or argon, for example. The first circuit 13 feeds the high pressure process gas to a powder feed hopper 15 that contains the metal particles 5. The second circuit 14 feeds the high pressure process gas to a heater 16. The two circuits converge at nozzle 6, which has an on-board electric heater 17.

The two heaters 16 and 17 are used to ensure that the process gas stream has a temperature of between 600° C. and 800° C., and most preferably 700° C., when it is ejected from the nozzle 6. A process gas stream temperature of lower than about 600° C. is likely to inhibit the deformation of the metal particles on impact with the part that is being formed by the cold-gas dynamic spraying equipment. A process gas stream temperature of greater than about 800° C. may lead to melting or over-softening of the metal particles 5, which may lead to the particles disintegrating on impact with the part, adversely affecting spray efficiency and part mechanical integrity.

The arrangement of FIG. 1 is capable of ejecting the metal particles 5 from the nozzle 6 at supersonic speeds, which are typically in excess of 1000 m/s. This provides the particles with sufficient kinetic energy to fuse to the support member upon impact. Importantly, the cold-gas dynamic spraying process does not heat the metal particles 5 beyond their melting point. Hence, the original structure and properties of the metal particles 5 may be preserved without the alterations that would otherwise be caused by the phase changes inherent in technologies that melt the metal, such as forging and casting, for example. More details with regards to cold-gas dynamic spraying equipment is available at U.S. Pat. No. 5,302,414, the contents of which are hereby incorporated in their entirety by way of reference.

As best shown in FIG. 2, the additive manufacturing equipment 4 also includes a robotic assembly in the form of a robotic arm 9 that is configured to position and orientate the nozzle 6 so as to direct the spray of metal particles 6 onto the support member as the support member is being rotated. A programmable controller, which may be a suitably programmed generic computing system, or may be a dedicated control system, is configured to drive the robotic arm 9. That is, the programmable controller sends command signals that are received by the robotic arm 9. These command signals define the configuration that the robotic arm 9 is to assume, which ultimately defines the position and orientation of the nozzle 6. This, in turn, defines the trajectory of the metal particles 5 that are ejected at very high speed from the nozzle 6 so as to impact upon, and thereby bind to, the support member 8. Over time this deposition process builds up an outer layer of material that surrounds and is bonded to the support member 8, as shown for example in FIGS. 3 and 4.

Figure 9:
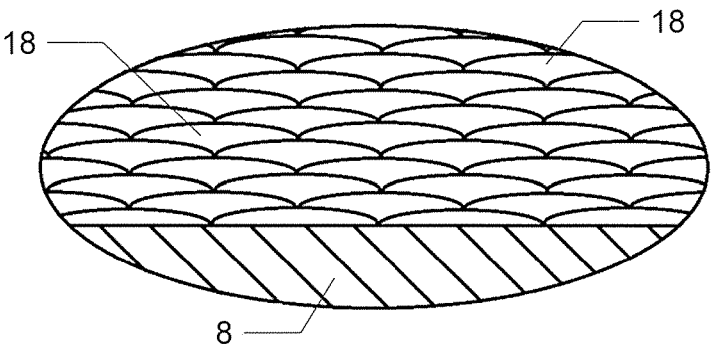
FIG. 9 is a schematic cross-sectional magnified view of a portion of the casing sidewall depicting an interlaced grain formation created by deposition of successive beads.

As the nozzle 6, from which the metal particles 5 are being ejected, makes a pass relative to the support member 8, a bead 18 of material is deposited. The programmable controller may be configured so as to drive the robotic arm 9 to position and orientate the nozzle 6 so as to deposit the beads 18 of metal particles 5 onto the rotating support member 8 in the form of interlaced layers. As illustrated in FIG. 9, the interlacing effect is achieved by aligning the centres of the beads 18 forming a lower layer with the edges of the beads 18 forming the layer immediately above. This is similar to the familiar manner in which bricks may be layered and interlaced to form a wall. The interlacing of the layers of beads 18 effectively forms a grain-like structure, which contributes improved directional strength properties to the finished casing. For casings that are intended to offer strong penetrative performance, the interlaced layers of beads 18 extend in the circumferential direction because this contributes to increased tensile strength in the axial and circumferential directions. In other words, the interlaced layers of beads 18 forming the cylindrical body portion 3 have an elongate dimension extending parallel to the longitudinal axis of the cylindrical body portion 3.

The composition of the metal particles 5 sprayed from the nozzle 6 may be varied as the positioning of the nozzle 6 changes relative to the support member 8. This may be achieved by varying the composition of the materials that are entrained into the process gas stream as the position of the nozzle 6 changes relative to the support member 8. This technique may be used to vary the density of deposited material as between differing parts of the bomb casing. This technique may also be used to vary a chemical property of deposited material between differing parts of the bomb casing. For example, one embodiment makes use of multiple powder feed hoppers 15, with the compositions of the contained metal particles 5 varying between different hoppers 15. In this embodiment, the programmable controller is configured to issue command signals to define and change the particular hopper 15 from which the metal particles 5 are to be sourced for use in the cold gas dynamic spraying process. In an example implementation of this embodiment, a first hopper 15 contains metal particles 5 having little or no high density refractory metals or alloys. A second hopper 15 contains metal particles 5 having a substantial proportion of high density refractory metals or alloys, such as any one of:

20% to 30% by wt. Tungsten metal or alloys such as WC or WC_Ni14;

2% to 10% by wt. nickel metal or alloys;

3% to 4% by wt. vanadium metal or alloys; or

3% to 4% by wt. manganese metal or alloys.

These additives can improve properties of the deposited material, such as ductility, elongation, density, strength and hardness. The operator, when programming the programmable controller, may select ratios of the various additives to tune for specific desired characteristics. This may entail striking a balance, or trade-off, between things such as hardness vs ductility.

In this example, the programmable controller is programmed to send a command signal to ensure that the metal particles 5 are sourced from the first hopper 15 whilst the nozzle 6 is positioned and oriented relative to the support member 8 so as to be depositing material that will form the cylindrical body 3. However, when the nozzle 6 is moved to a position and orientation relative to the support member 8 where it is depositing material that will form the conical nose portion 2, the programmable controller issues a command signal to the multiple powder feed hoppers 15 to source the metal particles 5 from the second hopper 15. This ensures that the deposited material forming the conical nose portion 2 includes the high density refractory metals or alloys and therefore has enhanced penetrative properties. However, the cylindrical body 3 typically does not require such enhanced penetrative properties and hence the materials deposited to form the cylindrical body 3 need not include the high density refractory metals or alloys. In a slight variation, the programmable controller may be programmed to ensure that the deposited materials forming a portion of the cylindrical body 3 adjacent to the generally conical nose portion 2 also includes the high density refractory metals or alloys. This allows the portion of the cylindrical body 3 adjacent to the generally conical nose portion 2 to buttress the conical nose portion 2.

In one embodiment of the bomb casing 1, the generally conical nose section 2 has the following properties, which are desirable for penetrative performance:

an ultimate tensile strength of greater than 1320 MPa;

a yield tensile strength of greater than 1200 MPa;

a minimum elongation-at-break of 11%;

a through hardness of greater than 44 Rockwell C scale; and a density of greater than 7.86 g/cc.

The programmable controller may also be programmed to alter various spraying parameters dependent upon the positioning of the at least one nozzle 3 relative to the support member 8. Such parameters may include: spray standoff distance; spray path linear speed; and/or spray offset distance. For example, the programmable controller may be programmed to increase one or more of these parameters by between 1% and 50% inclusive when the nozzle 6 is depositing material to form the cylindrical body portion 3. This increased amount is relative to the normal amount of the relevant parameter when the nozzle 6 is depositing material to form the conical nose portion 2. Such variations to the spraying parameters may be used to tune properties such as decreasing the elongation-at-break value of the deposited materials forming the cylindrical body portion 3. This can allow the cylindrical body portion 3 to offer improved fragmentation performance, such as decreasing fragmentation from 10%-15% to 7%-8%, which yields smaller, more uniform fragments.

It has been appreciated by the inventors of the present application that in a bomb casing construction context, it is preferable for a median size of the metal particles 5 to be between 15 μm and 55 μm inclusive, with 53 μm being considered an optimum for some embodiments of the process. Particles below 15 μm typically do not have enough energy to deform and adhere on impact with the support member 8. This is due to their low mass leading to low kinetic energy after acceleration in the process gas stream. Particles above 55 μm are typically not accelerated to a sufficient velocity due to their higher mass and therefore may not have enough energy to deform and adhere on impact with the part. The undesirable effects of poor adhesion to the part, whether cause by particles too large or too small, are:

Lower part integrity, porosity due to improperly fused particles;

Lower spray efficiency due to powder not adhering to the part; and

Increased volume of waste powder to be handled by contamination control systems.

It has been appreciated by the inventors of the present application that in a bomb casing construction context, it is preferable for a median hardness of the metal particles 5 to be less than 30 Rockwell C. Powder hardness was identified as an important process variable in cold gas dynamic spraying of high-strength ferrous alloys during empirical trials. The cold gas dynamic spraying process relies on particles to flatten and adhere to the support member 8 upon impact, and the hardness of particles has a direct effect on how efficiently this is achieved. Excessive hardness of the metal particles may inhibit the particles from adhering to the part under formation. Instead, the excessively hard particles may bounce off from the surface, contributing to lower process efficiency and higher powder waste. Alternatively, excessive hardness may cause the particles to adhere, but not to flatten properly. This results in very high porosity and unacceptably low part strength. The problem of non-adherence of particles due to high hardness was empirically found to dramatically worsen as in cases where the spray jet impacts the part at angles away from perpendicular. Metal powders with softer particles can be sprayed successfully at much shallower impact angles than harder powders. Hard powders result in a limiting impact angle where adhesion of particles appear to stop completely, and this limiting angle imposes constraints on the geometry of parts that can be built.

It has been appreciated by the inventors of the present application that in a bomb casing construction context, it is preferable for a flow rate of the metal particles 5 emanating from a single nozzle to be between 16 kg/hour and 35 kg/hour, with the optimum for some embodiments of the process being at around 25-30 kg/hour. Below about 16 kg/hour it becomes uneconomical to use the cold gas dynamic spray process for the manufacture of aerial bomb casings because the production rate is too low. Financial analysis has shown that the process becomes cost competitive with traditional manufacturing methods above approximately 16 kg/hour per spray head. Above a 35 kg/hour per spray head powder flow rate is likely to cause problems in managing the heat of formation in the part being manufactured by the cold gas dynamic spraying process. The formation process results in localised heat where the spray jet impacts the part and this heat then distributes through the part by thermal conduction. Heat is removed from the part by mainly natural and forced convection. It is presently theorized that managing heat build up in the part through cooling methods may allow for higher flow rates than 35 kg/hour per spray head of powder to be achieved.

It has been appreciated by the inventors of the present application that in a bomb casing construction context, it is preferable for a spray standoff distance between the nozzle outlet and the substrate to be between 15 mm and 50 mm inclusive, with the optimum being approximately 15 mm to 25 mm. The spray jet increases in diameter due to divergence of the jet as distance from the nozzle 6 increases. Due to this effect, the width of the bead 18 of deposited material increases and the maximum thickness of the bead 18 decreases as the offset distance is increased. The velocity of the spray jet also decreases with increased offset distance. An offset distance of less than approximately 15 mm may result in too thick and narrow a bead 18 being deposited, and local heat dissipation may be inadequate. Excessive localised heat in the formation of the bead 18 may adversely affect the metallurgy of the part that is being formed by the cold gas dynamic spraying process. An offset distance of greater than approximately 50 mm may result in too low an impact velocity for particles especially on the outer layers of the beam. This has potential to adversely affect spray efficiency and may lead to increased porosity and lower mechanical integrity of the part.

It has been appreciated by the inventors of the present application that in a bomb casing construction context, it is preferable for a spray path linear speed to be between 0.5 m/s and 1.5 m/s, with the optimum for some embodiments being approximately 1.0 m/s. In a context such as that described above in which the support member is rotated whilst the spraying occurs, the spray path linear speed may be calculated from the rotation speed and the diameter of the part that is being formed at the position where the bead 18 is being deposited. A spray path linear speed of less than 0.5 m/s is likely to cause the deposited bead 18 to be too thick. Additionally, localised heat at the position of impact may become excessive. At spray path linear speeds exceeding 1.5 m/s, the bead 18 may become too thin and porosity at the outer edges of the bead 18 may increase unacceptably. When spraying the conical nose portion 2 at a position towards the tip of the casing, as shown in FIG. 3, the rotational speed required to achieve a linear path speed greater than 0.5 m/s may be excessive due to the small diameter of the tip. To correct for this, it may be necessary to program the robotic arm 9 to displace the nozzle 6 around the tip of the conical nose portion 2 in an opposite rotational direction to the direction in which the support member 9 is being rotated.

Figure 10:
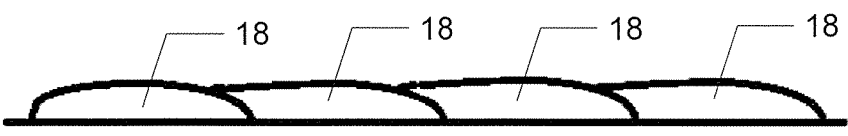
FIG. 10 is a schematic cross-sectional magnified view showing an overlapping bead formation contributing to a smoother outer finish.

It has been appreciated by the inventors of the present application that in a bomb casing construction context, it is preferable for a spray path overlap between adjacent beads 18 to be between 30% and 60% of a spray path overlap that would result in minimal overlapping of the two adjacent beads 18. This helps create a smoother finish to the outer surface, as illustrated for example in FIG. 10. The aim is for adjacent beads 18 to overlap so that the combined thicknesses of their shallower sections add to a thickness that is close to the maximum thickness of a single bead 18.

The cold gas dynamic spraying process, as illustrated in FIG. 3, continues until the deposition has created the desired sidewall thickness, shape and overall casing properties. Some examples of the resultant casings are shown in FIGS. 4 to 8.

An embodiment of the manufacturing process includes the step of heat treating the bomb casing once the cold-gas dynamic spraying has been completed. This heat treatment is generally very similar to the heat treatment steps used in the traditional bomb casing manufacturing process; except it is anticipated that substantially less total energy is likely to be required when heat treating an embodiment of the present invention. This is mainly due to the aforementioned desirable properties yielded by the lack of melting of the metal particles 5 during the cold gas dynamic spraying process.

After heat treatment of the bomb casing, at least one more layer of metal, ceramics, energetic material or any combination thereof may be applied to at least a portion of an outer surface of the bomb casing by means of cold-gas dynamic spraying. The composition of this final layer may be selected so as to increase the potential lethality of the bomb casing, to improve its shelf life and/or to create radiation shielding.

A final step in the process of manufacturing the bomb casing is machining of the outer and/or inner surfaces of the bomb casing. Such machining steps are very similar to the machining steps performed in the traditional casing manufacturing methods. In some embodiments this machining may remove some or all of the material that originally comprised the support member 8. In other embodiments of the method, the support member 8 is wholly retained within the bomb casing, as illustrated for example in FIG. 3.

In some embodiments the generally conical nose portion 2 and the cylindrical body portion 3 are integrally formed, as shown for example in FIGS. 3, 4, 6, 7 and 8. Hence, in some embodiments, the resultant bomb casing may be considered to be of unitary construction.

It will be appreciated that if the same metal particles 5 are used throughout, and if all other spray parameters are kept constant, then the generally conical nose portion 2 and the cylindrical body portion 3 may each have substantially uniform metal properties along their lengths. Alternatively, the metal particles utilised, and/or the other spray parameters, may be tailored to create a bomb casing in which the generally conical nose portion 2 and/or the cylindrical body portion 3 has substantially uniform metal properties across each transverse cross-section taken along its length.

An embodiment of the casing may be engineered to have metal properties defining a rupture mechanism and/or rupture seams. In one embodiment, the rupture mechanism and/or rupture seams are defined by geometric features, such as channels for example, provided upon the scaffold and/or combined with geometric features on a final outer shape of the bomb casing. In another embodiment the rupture mechanism and/or rupture seams are lines of weakness extending axially and/or transversely along the cylindrical body portion. These lines of weakness are established during the cold gas dynamic spraying process by programming the programmable controller to change one or more spray parameters when depositing material in a proposed area of weakness. This may involve establishing a change in any spray parameter that impacts upon the strength of the deposition, such as a change in metal particle composition, deposition density, bead deposition geometry, etc.

It will be appreciated by those skilled in the art that the present invention provides numerous important practical advantages as compared to the traditional bomb casing manufacturing methods that rely upon casting or forging. As mentioned earlier, design freedom is limited in traditional casting or forging manufacturing methods. In comparison, the additive methods of the present invention allow freedom to customise manufacturing parameters without the need for extensive and expensive re-tooling of production lines or access to a foundry. The additive methods of the present invention also allow for easy and economical experimentation and protype development. Additionally, embodiments of the present invention provide mass production methods that offer a costs advantage as compared to the traditional methods.

The cold spray deposition process enables various design flexibilities, such as:

1. The variance of deposition parameters to provide the design flexibility of having variations of the metal properties in various portions of the casing. This can assist with the provision of features such as rupture mechanism and/or rupture seams, for example.
2. The design flexibility of having variations of the metal powders used to form various portions of the casing. This can allow for a plurality of pre-selected metal types to be mixed in a predetermined ratio to achieve the required properties, such as hardness for example. In one embodiment a warhead is provided with extra hardness in the conical nose portion 2 as compared to the hardness of the majority of the cylindrical body portion 3. This may be achieved by the spraying of material that includes high density refractory metals or its alloys e.g. Tungsten, WC, WC_Ni14, etc. to form the conical nose portion 2. It will be appreciated that the high density refractory material has increased weight, which results in increased kinetic energy when the bomb is in motion.
3. The design flexibility of being able to fabricate the bomb casing 1 by depositing a plurality of beads 18 that form layers that impart grain-like directional strength properties.

While a number of preferred embodiments have been described, it will be appreciated by persons skilled in the art that numerous variations and/or modifications may be made to the invention without departing from the spirit or scope of the invention as broadly described. The present embodiments are, therefore, to be considered in all respects as illustrative and not restrictive.

The invention claimed is:

1. A process for additively manufacturing bomb casings defining a generally conical nose portion and a cylindrical body portion, the process including using cold-gas dynamic spraying equipment configured for spraying of metal particles entrained within a gas stream emanating from at least one nozzle to additively manufacture at least one of the generally conical nose portion and/or the cylindrical body portion of the bomb casing, wherein the metal particles as deposited onto a support member form interlaced layers extending in a circumferential direction, wherein a separation distance between adjacent layers is defined by a spray path overlap of the nozzle during cold-gas dynamic spraying of the metal particles forming the adjacent layers and wherein the spray path overlap between adjacent layers is between 30% and 60% of a spray path overlap that would result in minimal overlapping of the two adjacent layers.

2. A process according to claim 1 wherein the interlaced layers forming the cylindrical body portion have an elongate dimension extending parallel to a longitudinal axis of the cylindrical body portion.

3. A process according to claim 1 wherein a composition of the metal particles sprayed from the at least one nozzle is variable dependent upon a positioning of the at least one nozzle relative to the support member.

4. A process according to claim 3 wherein variation of the composition of the metal particles results in a variation of a density of deposited material between differing parts of the bomb casing.

5. A process according to claim 3 wherein variation of the composition of the metal particles results in a variation of a chemical property of deposited material between differing parts of the bomb casing.

* * * * *